United States Patent
Lin

(10) Patent No.: US 7,089,548 B2
(45) Date of Patent: Aug. 8, 2006

(54) METHOD AND SYSTEM FOR NONDISRUPTIVE DEPLOYMENT DURING UPGRADING OF ENTERPRISE SYSTEMS

(75) Inventor: Chih-Tsung Lin, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 745 days.

(21) Appl. No.: 10/341,139

(22) Filed: Jan. 13, 2003

(65) Prior Publication Data

US 2004/0139175 A1  Jul. 15, 2004

(51) Int. Cl.
G06F 9/44 (2006.01)

(52) U.S. Cl. .................. 717/168; 717/171; 717/172; 717/713

(58) Field of Classification Search ........... 717/168, 717/171–173; 707/203; 709/220–221, 229
See application file for complete search history.

(56) References Cited

U.S. PATENT DOCUMENTS

| | | | | |
|---|---|---|---|---|
| 5,287,508 A * | 2/1994 | Hejna et al. | ........ | 718/102 |
| 5,835,911 A * | 11/1998 | Nakagawa et al. | ........ | 707/203 |
| 5,974,566 A * | 10/1999 | Ault et al. | ........ | 714/15 |
| 6,058,445 A * | 5/2000 | Chari et al. | ........ | 710/302 |
| 6,151,708 A | 11/2000 | Pedrizetti et al. | ........ | 717/11 |
| 6,167,567 A * | 12/2000 | Chiles et al. | ........ | 717/173 |
| 6,199,204 B1 | 3/2001 | Donohue | ........ | 717/11 |
| 6,202,207 B1 | 3/2001 | Donohue | ........ | 717/11 |
| 6,606,744 B1 * | 8/2003 | Mikurak | ........ | 717/174 |
| 6,976,079 B1 * | 12/2005 | Ferguson et al. | ........ | 709/229 |
| 2002/0112076 A1 * | 8/2002 | Rueda et al. | ........ | 709/245 |
| 2002/0147645 A1 * | 10/2002 | Alao et al. | ........ | 705/14 |
| 2003/0172145 A1 * | 9/2003 | Nguyen | ........ | 709/223 |
| 2004/0031030 A1 * | 2/2004 | Kidder et al. | ........ | 717/172 |
| 2004/0139147 A1 * | 7/2004 | Duquenne et al. | ........ | 709/200 |
| 2005/0138084 A1 * | 6/2005 | Azagury et al. | ........ | 707/200 |

OTHER PUBLICATIONS

Author: Jin Jing, Abdelsalam Helal, Ahmed Elmagarmid Title Client-Server Computing in Mobile Environments Date: Jun. 1999 Publisher: ACM Computer Surveys vol. 31, No. 2.*
Valeria Cardellini, Emiliano Casalicchio The State of the Art in Locally Distributed Web-Server Systems Jun. 2002 ACM Computing Surveys, vol. 34, No. 2 pp. 263-311.*

(Continued)

Primary Examiner—Wei Zhen
Assistant Examiner—Anna Deng
(74) Attorney, Agent, or Firm—Haynes and Boone, LLP

(57) ABSTRACT

A method and system that provides for near-zero downtime when updating enterprise system software in a client/server environment and elimination of the need to re-compile the client code with a new server component name as the new name can be addressed in a naming service. Client components will automatically connect to new-version enterprise server components that are backward compatible. Old-version client components will still work as new enterprise server components are deployed even if they are not backward compatible. Using a design with a step algorithm, the incompatibilities of client and enterprise server components are resolved. Client components automatically check a configuration file at initialization time or in parallel for the correct compatible version to use. Client rollback to the previous version is easily accomplished if bugs are found in the new deployment.

26 Claims, 4 Drawing Sheets

OTHER PUBLICATIONS

Robbert Van Renesse, Kenneth P. Birman Astrolabe: A Robust and Scalable Technology for Distributed System Monitoring, Management, and Data Mining May 2003 ACM Transactions on Computer Systems vol. 21, No. 2 pp. 164-206.*

* cited by examiner

FIG. 1 – Prior Art

METHOD AND SYSTEM FOR NONDISRUPTIVE DEPLOYMENT DURING UPGRADING OF ENTERPRISE SYSTEMS

BACKGROUND OF THE INVENTION

1. Field of Invention

This invention relates generally to the development and maintenance of enterprise client/server systems and, more particularly, to a method and system for seamlessly updating software in 24 by 7 environments with minimal impact to current real-time processing.

2. Description of Related Art

System downtime in real-time client/server environments leads to service interruptions that are no longer acceptable when customers expect their services to be up and running 24 hours a day, 7 days a week. However, software requires frequent updating to add features, fix problems that are found, and generally improve the product offered to customers. During updates of the software modules, the production system that the customers are using must often be shut down, thus interrupting service. An interruption in service may also occur when ensuring that client components match with the correct version of the enterprise server component.

Correct versions are essential so that each piece of software works with each other. During the downtime, testing is done to ensure that the new client and server codes in the software work together on the production system. Bringing up the production system with incompatible code will result in a system outage while customers are trying to use the system. This can be hard to recover from, taking a significant amount of time to debug and resolve. The longer the system is unavailable due to testing time or other reasons, the more the customer dissatisfaction. Because of the effect of downtime to these 24 by 7 enterprise client/server systems, downtime is scheduled for low-use times such as the middle of the night. This was a reasonable solution before the use of the Internet. Systems are now used by customers all over the world in different time zones, eliminating the traditional overnight low time.

Several methods or systems related to development and maintenance of software systems are available. In U.S. Pat. No. 6,202,207 (Donohue) a method and mechanism for synchronized updating of interoperating software is discussed. In U.S. Pat. No. 6,199,204 (Donohue) a method and mechanism for automatically updating computer programs is presented. In U.S. Pat. No. 6,167,567 (Chiles et al.) a technique for automatically updating software programs is presented. In U.S. Pat. No. 6,151,708 (Pedrizetti et al.) a method of comparing software updates in client/server environments is presented. In U.S. Pat. No. 5,835,911 (Nakagawa et al.) a method and system for the distribution and maintenance of software is presented.

A new, simple, easy, and safe method to do updates and maintenance is needed which will not impact a 24 by 7 operation by causing significant downtime. This invention provides such a system and method.

SUMMARY OF THE INVENTION

This invention's overall objective is to provide a method for nondisruptive updating of client/server systems. This objective is accomplished by applying a step procedure combining generation of a unique identifier for a new server component with deployment and un-deployment of system components. Additionally, it is an objective to provide for the registering of unique identifiers in a naming service. Another objective is then to allow testing of the new server component to be done simultaneously while a current server component remains available to current clients.

Still another objective is to generate a configuration file from which to obtain the value of the next step. Also, it is an objective to deploy a new client component with accompanying system downtime equal to the client component deployment time. Yet another objective is to make a new configuration file available in place of the configuration file to the new client with the next step value now the current step value. It is also an objective to access the new server component via the naming service by using the new configuration file step value. Finally, it is an objective to provide for the resumed use of the previous version if problems arise with the new server components.

These objectives are met by the method of this invention. This method and system for nondisruptive deployment during upgrading of enterprise systems allows new program development and maintenance to be deployed on real time while making the system downtime almost transparent to the system users and customers.

BRIEF DESCRIPTION OF THE DRAWINGS

This invention will be described with reference to the accompanying drawings, wherein.

DETAILED DESCRIPTION OF THE PREFERRED EMBODIMENT

In large companies of today that require enterprise client/server systems to support many users, updating and deploying programming component changes can be a significant problem because these systems operate 24 hours a day, seven days a week. Most systems are connected to the Internet and have users worldwide in a plurality of time zones, therefore making it very difficult to find a light-usage time when systems can be shut down to update components. In the prior art, these systems were updated with new software modules by shutting down the server during the lowest usage time. During this shutdown time (outage), the new updated software module was installed and then tested by program developers to ensure the new code worked properly on the production server. If the testing showed that the new code worked properly, the server was then put back into production ending the outage and allowing customers to use the system again. However, if the new code was found to have problems, the outage was extended as additional information about the code problem was obtained and the old program code module was temporarily put back to get the system working again. An additional system shutdown then became necessary once the code was fixed by the developers with more inconvenience to the customers.

Figure 1:
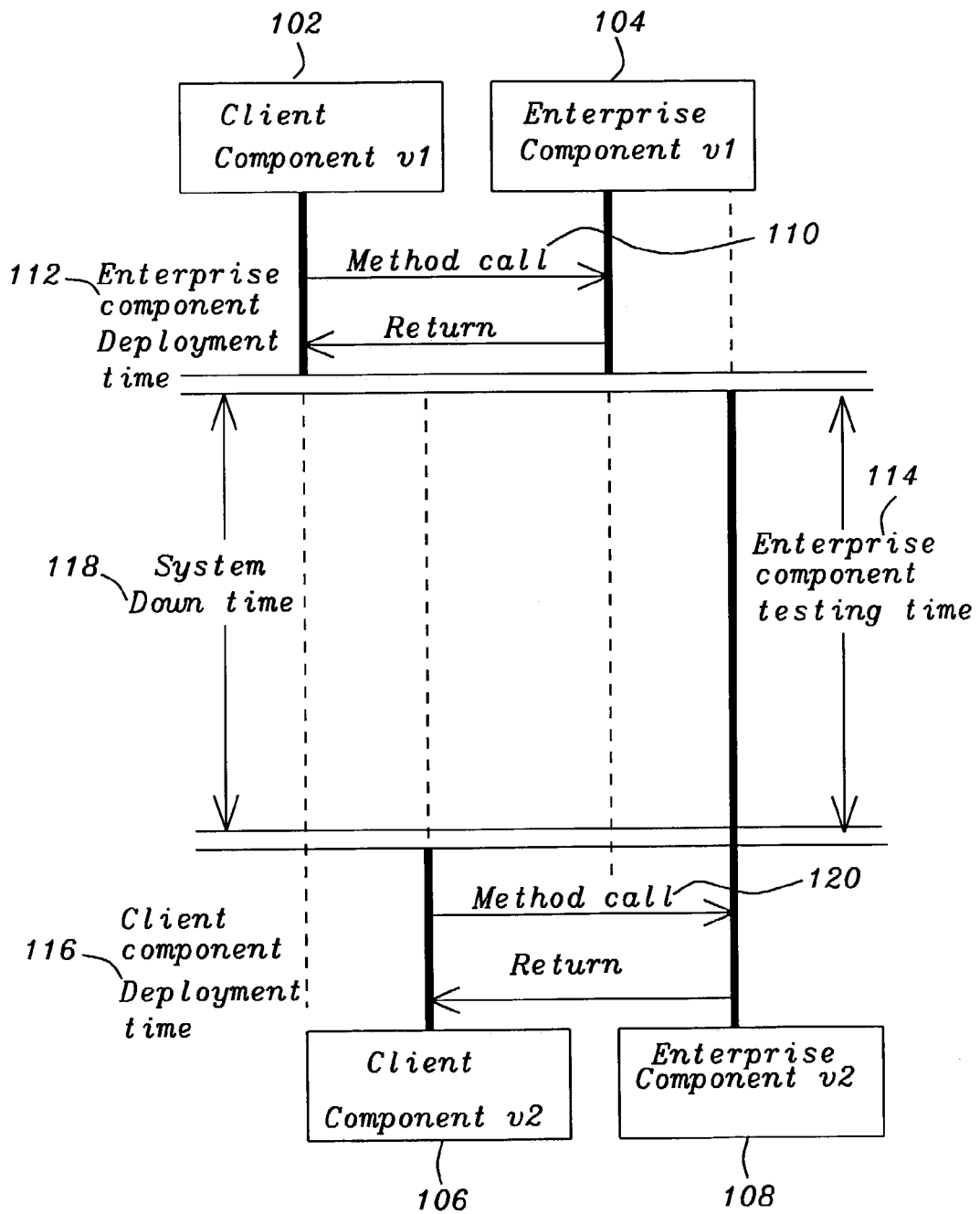
FIG. 1 is a diagram showing the prior art deployment of new components.

FIG. 1 is a flow diagram showing the prior art deployment of new software to a client/server system. The Client Component v1 102 is the existing client code on client computers. The Enterprise Component v1 104 is the existing server code on the enterprise server. This FIG. 1 which displays time on the y-axis shows the deployment of the new Client Component v2 106 and the new Enterprise Component v2 108. The x-axis shows the components being deployed. Before the Enterprise Component Deployment Time 112, the Client Component v1 102 and the Enterprise Component v1 104 communicate with each other by a Method call 110 from the client to the server with the server returning the proper function requested. Both components are at the same version and their functions are compatible.

As the new Enterprise Component v2 is introduced, the server must be shut down to ensure that the current Client Component v1 102 does not access the new code before the Enterprise Component Testing Time 114 is done in the production environment. Once that testing is satisfactorily completed, the Client Component Deployment Time 116 is needed to deploy the client to the customer computers. During this entire deployment time, the accumulated System Downtime 118 has caused an outage to the customer. Once the deployment is completed the Method Call 120 will return the proper version 2 function as both the client and server code are now at the same release level ensuring compatible function.

The extended System Down Time 118 is a major problem with this method as the customer can not access the system. Reducing this time can increase customer productivity and satisfaction with the overall system. Under the old method, re-compiling the client code with the new release function names would be required. This invention provides a new method and system to not only significantly reduce the system downtime to the extent that it is practically unnoticeable to customers (milliseconds to seconds, depending new client component size) but to provide for the server component name to be changed in the naming service instead of by re-comlpiling client code. Changing the name in the naming serve is safer and saves time.

Figure 2:
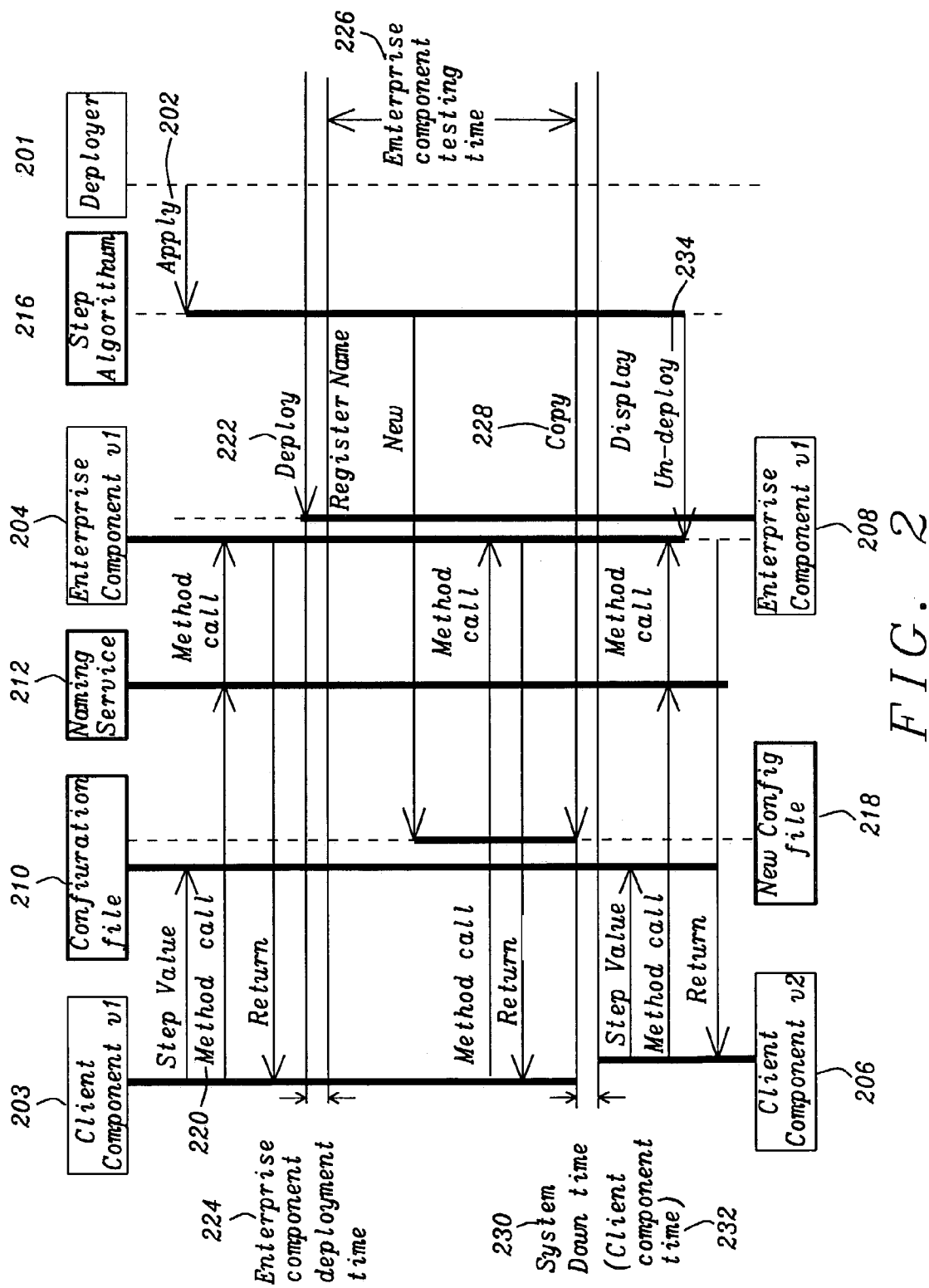
FIG. 2 is a diagram showing detailed seamless deployment of new components.

To reduce the system downtime, the new method introduces some new system components. These consist of a naming services function, its associated configuration file, and a step algorithm function (step procedure) that combines generation of a proper name (unique identifier) for a new enterprise (server) component with deployment and un-deployment of system components in order to point client components to correct enterprise components. These introduced entities are shown in FIG. 2 in the same format as the prior art FIG. 1. Their introduction changes the implementation process and is best described by showing how it works with the deployment of new-release client and enterprise software components.

This new approach is based on a Step Algorithm function 216 whose step-naming function generates a name for the new enterprise server component and registers it with a Naming Service function 212 which contains server component names and addresses. The step algorithm function also creates a configuration file from which to get the value of a step so that the clients know with which enterprise components to connect. The client initially loads the current step value from the configuration file, and the step value is then passed to the naming service function through that enterprise component's method call or a secondary thread connection to the configuration file can allow checking the configuration file in parallel. Naming service then issues a call for the correct enterprise component. This ensures that correct release enterprise components are used.

The main purpose of the step-naming part of the Step Algorithm function 216 is to generate the proper name (unique identifier) for each enterprise component as a new release of the code is deployed to it. The step-naming function in the step algorithm function calculates a value of a parameter called the Current_Step which iterates between binary zero and one. Specifically, the Current_Step is calculated as:

Current_Step::={01} (value read from present configuration file)
Component_Ref::={Component reference name which has been defined in interface}
Next_Step::=(Current_Step) XOR (1)
Component_Name::=Component_Ref+Next_Step Thus, the Next_Step is the opposite from the value of Current_Step and changes for each new release. The Component_Name alternates with a one or zero as the suffix to its name and is always a different name than a previous step.

Looking at FIG. 2, a currently-running Client Component v1 203 and Enterprise Component v1 204 are running on the client/server enterprise system. The program developer Deployers 201 are ready to update the system by adding a new version of a client and server component. They apply the new server component to the Step Algorithm function 216. The step algorithm function registers the assigned name with a Naming Services function 212, and creates a new Configuration File 218 that contains the Next_Step value. These three new system components work together to support the new method.

Looking at each new function in detail, the Step Algorithm function 216 is a program that receives the new release code deployed by the program developers. It then:

1. determines the Current_Step value.
2. deploys the new version code of the enterprise component and registers the new Component_Name (determined by the step-naming function) in the naming service.
3. generates a new configuration file by setting Next_Step to Current_Step.
4. deploys the client components and replaces the old configuration file with the new configuration file for the clients.
5. removes the previous version of the enterprise server component after a period of observation time (If a problem is discovered in the new code, the previous client and enterprise components and the previous configuration file can be restored to quickly return to the old level of code).
6. makes it possible for a client to access the new server component via the naming srevice using the new configuration file step value.

It is important to note that it is the interaction of the Step algorithm function 216, Naming Service function 212, Configuration File 210, and New Configuration File 218 (created by the Step Algorithm) that is key to this new method and system. It is seen in FIG. 2 that the Step Algorithm function 216 Deploys 222 the new Enterprise Component v2 208 during the Enterprise component deployment time 224, then registers its name with Naming Service 212, and creates the New Configuration File 218 with the new step value. At the same time, Client Component v1 203 is still in production using the original Configuration File 210 and is still using the original Enterprise Component v1 since its step and the Naming Service point to them.

With Enterprise Component v2 on the server, Enterprise Component Testing Time 226 can take place. In the prior art, this time would be downtime to the customer. With this method, however, both releases exist at the same time and developers can use the new Enterprise Component v2 fully installed without affecting current customers. Once testing is completed, the Step Algorithm function 216 can Copy 228 the New Configuration File 218 onto the Configuration File 210 and can deploy the new Client Component v2 206. This creates a short System Downtime 230 which is the same as the Client Component Deployment Time 232. It is barely noticeable to the client customers as the downtime is milliseconds to seconds depending on the size of the client component. The copied New Configuration File 218 which has taken the place of the former Configuration File 210 contains the proper Current_Step value for the new release.

In the case where a problem arises, the previous versions of the client component and configuration file can be redeployed. Since the configuration file controls which enterprise component is accessed, if the client components were written to run with either of the enterprise releases (backward compatible) then copying back the old configuration file will get the client to the old enterprise component. If not backward compatible, copying back the original client code and the original configuration file puts the old release code back into production quickly. After a period of observation, the previous version (Enterprise Component v1 204) can be un-deployed by the Step Algorithm 216.

Figure 3:
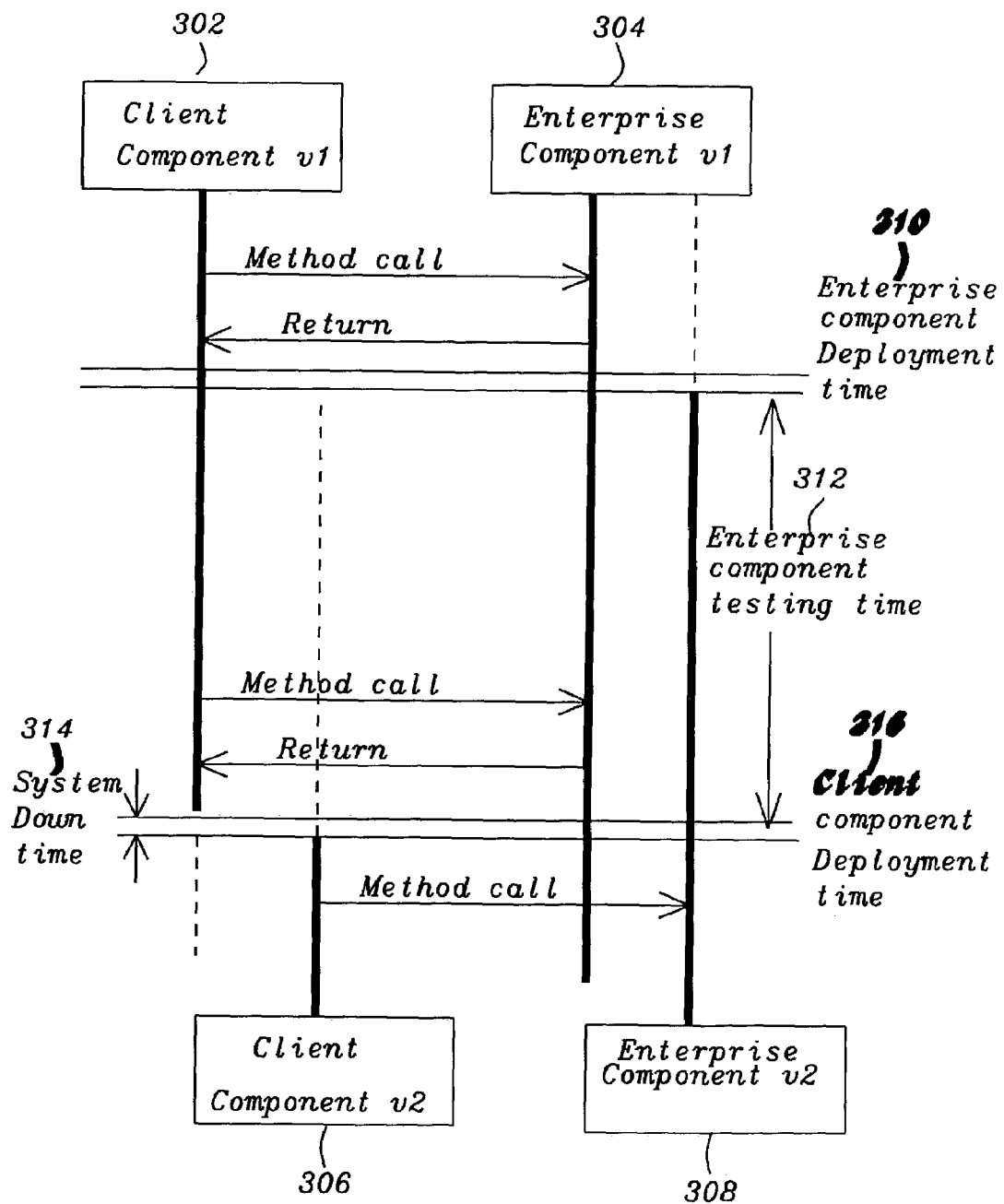
FIG. 3 is a diagram showing seamless deployment of new components.

FIG. 3. shows a diagram of the seamless method without the detail of the new system functions. The current Client Component v1 302 and Enterprise Component v1 304 interact by the method call and return of function. The configuration file and naming service are relayed by the system and are transparent to the actual function. When the new-release enterprise component is deployed, Enterprise Component Deployment Time 310 is short and causes little downtime to customers. The Enterprise Component Test Time 312 is accomplished with no effect on the customer as the current server component remains available to the current client component. A short System Down Time 314 is experienced during the Client Component Deployment Time 316.

Figure 4:
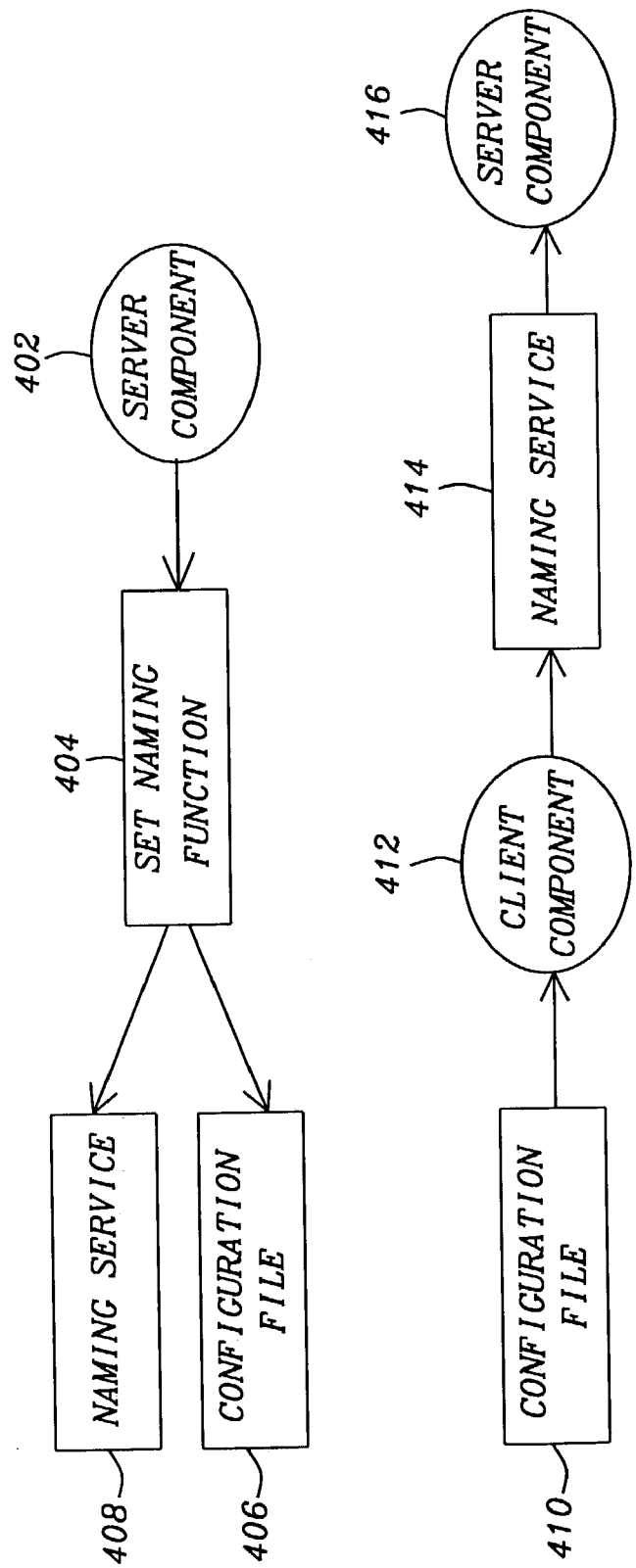
FIG. 4 is a flow diagram of the system.

FIG. 4 looks at just the parts of the system that perform the seamless capability of the method. The Server Component 402 being deployed is processed by the Step Naming Function 404 to get the next iteration of the step and to give a name to the new server component. The new step value is placed into the Configuration File 406 and the component name containing the new step value is registered in the Naming Service 408. Now when the Client Component 412 needs to use a function from the Server Component 416, the Configuration File 410 is read by the Client Component to get the current step value. Using that step value, Naming Service 414 gets the correct Server Component for that release.

The method and system of the invention provides advantages over the prior art including the time savings and safety derived from changing the component name in naming services rather than by re-compiling client code and near-zero downtime when upgrading system components. Client components automatically connect to new enterprise components if they are written backward compatible. An old client component will still work even when a new enterprise component is deployed and it is not backward compatible. Lastly, former components can be redeployed if problems arise.

While the invention has been particularly shown and described with reference to preferred embodiments thereof, it will be understood by those skilled in the art that various changes in form and details may be made without departing from the spirit and scope of the invention.

What is claimed is:

1. A method for nondisruptive updating of client/server systems comprising:

a. applying a step procedure combining generation of a unique identifier for a new server component with deployment and un-deployment of system components;
   b. registering said unique identifier in a naming service;
   c. using a step naming function Current_Step::={01} (value read from present configuration file) Component_Ref::={Component reference name which has been defined in interface}Next_Step::=(Current_Step) XOR (1) Component_Name::=Component_Ref+Next_Step is a part of said step procedure;
   d. generating a new configuration file having the values of Current_Step and Next_Step;
   e. providing for a new client component to be deployed accompanied by a system downtime equal to said new client component deployment time;
   f. making said new configuration file available to said new client component by setting the value of Next_Step to the value of Current_Step;
   g. accessing said new server component via said naming service using the step values in the new configuration file, and
   h. providing for resumed use of the previous version if problems arise with the new server component.

2. The method for nondisruptive updating of claim 1, wherein said step procedure assures compatibility between the client component and said server component.

3. The method for nondisruptive updating of claim 1, wherein the value of Current_Step will iterate wherein the value of current step will iterate between 0 and 1.

4. The method for nondisruptive updating of claim 1 wherein said component name derived from said step naming function is said unique identifier.

5. The method for nondisruptive updating of claim 4, wherein said unique identifier is registered with said naming service when said new server component is first deployed.

6. The method for nondisruptive updating of claim 5, wherein said naming service contains the server components' names and addresses.

7. The method for nondisruptive updating of claim 6, wherein said server component name can be changed in said naming service rather than by re-compiling client code.

8. The method for nondisruptive updating of claim 1, wherein said system downtime is approximately measured in milliseconds to seconds depending on the size of said new client component.

9. The method for nondisruptive updating of claim 1, wherein said client component will automatically connect to said new enterprise component if they are backward compatible.

10. The method for nondisruptive updating of claim 9, wherein if said client component is backward compatible only the previous configuration file needs to be deployed to access the previous server component when problems arise.

11. The method for nondisruptive updating of claim 1, wherein redeployment of the previous client component in combination with said previous configuration file allows for said resumed use of previous version.

12. The method for nondisruptive updating of claim 1, wherein the said new client component can either initially load said new configuration file information or receive it in parallel from a secondary thread connection to the said new configuration file when accessing said new server component.

13. The method for nondisruptive updating of claim 1, wherein said previous server component can be un-deployed after a period of successful operation of said new server component.

14. A system for nondisruptive updating of client/server systems comprising of:
   a. a means to apply a step procedure to combine generation of a unique identifier for a new server component with deployment and un-deployment of system components;
   b. a means to register said unique identifier in a naming service;
   c. a means to use a step naming function Current_Step::={01}(value read from present configuration file) Component_Ref::={Component reference name which has been defined in interface}Next_Step::=(Current_Step) XOR (1) Component_Name::=Component_Ref+Next_Step is a part of said step procedure;
   d. a means to generate a new configuration file having the values of Current_Step and Next_Step;
   e. a means to deploy a new client component with an accompanying system downtime equal to said new client component deployment time;
   f. a means to make said new configuration file available to said new client component by setting the value of Next_Step to the value of Current_Step;
   g. a means to access said new server component via said naming service using, the step values in the new configuration file, and
   h. a means to provide for resumed use of the previous version if problems arise with the new server component.

15. The system for nondisruptive updating of claim 14, wherein said step procedure assures compatibility between the client component and said server component.

16. The system for nondisruptive updating of claim 14, wherein the value of Current_Step will iterate wherein the value of current step will iterate between 0 and 1.

17. The system for nondisruptive updating of claim 14, wherein said component name derived from said step naming function is said unique identifier.

18. The system for nondisruptive updating of claim 17, wherein said unique identifier is registered with said naming service when said new server component is first deployed.

19. The system for nondisruptive updating of claim 18, wherein said naming service contains the server components' names and addresses.

20. The system for nondisruptive updating of claim 19, wherein said server component name can be changed in said naming service rather than by re-compiling client code.

21. The system for nondisruptive updating of claim 14, wherein said system downtime is approximately measured in milliseconds to seconds depending on the size of said new client component.

22. The system for nondisruptive updating of claim 14, wherein said client component will automatically connect to said new enterprise component if they are backward compatible.

23. The system for nondisruptive updating of claim 22, wherein if said client component is backward compatible only the previous configuration file needs to be deployed to access the previous server component when problems arise.

24. The system for nondisruptive updating of claim 14, wherein redeployment of the previous client component in combination with said previous configuration file allows for said resumed use of previous version.

25. The system for nondisruptive updating of claim 14, wherein the said new client component can either initially load said new configuration file information or receive it in parallel from a secondary thread connection to the said new configuration file when accessing said new server component.

26. The system for nondisruptive updating of claim 14, wherein the said previous server component can be un-deployed after a period of successful operation of said new server component.

* * * * *